(No Model.)

H. L. SCOFIELD.
CARPET STRETCHER AND TACK DRIVER.

No. 396,611. Patented Jan. 22, 1889.

Witnesses.
Chas. R. Burr.
Thomas Durant.

Inventor.
Henry L. Scofield
by Church & Church
his Attorneys.

UNITED STATES PATENT OFFICE.

HENRY L. SCOFIELD, OF ROCHESTER, NEW YORK, ASSIGNOR TO FREEMAN CLARKE, OF SAME PLACE.

CARPET-STRETCHER AND TACK-DRIVER.

SPECIFICATION forming part of Letters Patent No. 396,611, dated January 22, 1889.

Application filed May 29, 1888. Serial No. 275,455. (No model.)

*To all whom it may concern:*

Be it known that I, HENRY L. SCOFIELD, of Rochester, in the county of Monroe and State of New York, have invented certain new and useful Improvements in Combined Carpet-Stretchers and Tack-Drivers; and I do hereby declare the following to be a full, clear, and exact description of the same, reference being had to the accompanying drawings, forming a part of this specification, and to the figures and letters of reference marked thereon.

My present invention has for its object to provide an implement adapted for use in laying carpets which shall be cheap and simple in construction and combine in a single structure a carpet-stretcher and tack-driving device, the whole being so arranged that the implement will take hold of the carpet close to the extreme edge, if desirable, and when the carpet is stretched as much as desired the tack can be driven in line with the point of the engagement of the stretcher, thus obviating the necessity of placing the hand on the edge of the carpet to straighten it out before driving the tack, so that no further operation will be required; and the invention consists in a certain improved construction for carrying out the objects, all of which will be hereinafter described, and the novel features pointed out particularly in the claims at the end of this specification.

Figure 1:
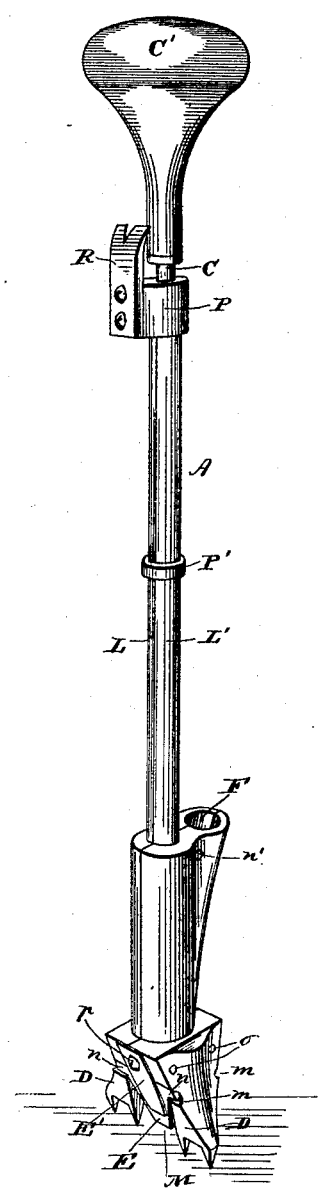
Figure 2:
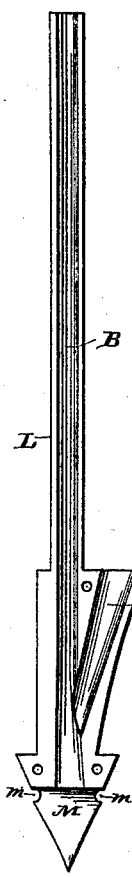
Figure 3:
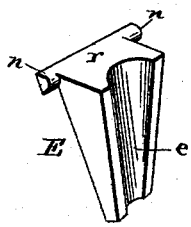
Figure 4:
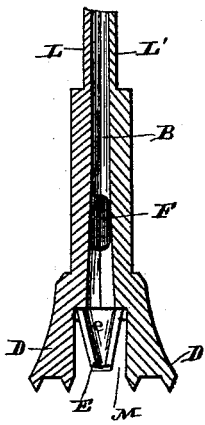

In the drawings, Figure 1 represents a view of an implement constructed in accordance with my invention; Fig. 2, a view of one of the sections of which it is composed; Fig. 3, a view of one of the tack-holding jaws; Fig. 4, a sectional view through the lower end of the implement.

Similar letters of reference in the several figures indicate the same parts.

The main portion of the implement is constructed of a stock, A, of any desired length, having a channel or passage, B, extending from end to end, in which is adapted to operate a rod or plunger, C, having at its outer end an enlargement or handle, C', preferably constructed of metal to give the necessary weight, and large enough to afford a firm bearing for the hand when stretching. At the lower portion of the stock, and preferably in line with and on either side of the plunger-slot, are two serrated prongs, D D, preferably constructed with the ordinary stretcher-edges and adapted to enter the carpet and take a firm bearing thereon, while the length of the plunger is such that the handle will engage with the end of the stock or a suitable stop when its end is even with the jaws, so as to prevent its interfering with the proper engagement of the serrations.

Between the stretching-prongs are pivoted two tack-holding jaws, E E, having grooves $e\ e$ in their inner proximate faces, preferably slightly tapering toward the bottom, and the perforation thus formed is substantially in line with the plunger-slot. Springs E' E' are arranged to bear on the jaws holding them together, but readily yielding to permit the passage of the end of the plunger when stretching or driving a tack, and returning them to normal position upon the withdrawal of the plunger.

F represents a tack-receiving channel in the stock, preferably having a slightly-flaring aperture extending downward and communicating with the plunger-channel near the lower end and just above the tack-holding jaws, so that a tack dropped into this channel when the plunger is raised will pass down, and, its point passing through the aperture between the jaws, will be held in position to be driven by another movement of the plunger downward, the jaws permitting its passage, as described.

The manner of using the above device will now be apparent. The operator moves the plunger down in the slot until the handle engages the top of the stock, then places a tack in the channel F and engages the stretching-prongs with the carpet near the edge, and, grasping the handle, stretches the carpet in the ordinary manner, the large handle affording a good grasping-surface and preventing injury to his hand. Then, to secure the carpet when the desired tension is obtained, he raises the stock to a vertical position, or nearly so, and withdraws the end of the plunger a short distance above the entrance of F into B, allowing the tack in the former to drop down and project between the jaws, and by a sharp downward movement of the plunger drives it through the jaws and into the floor, securing the carpet without further manipulation. The implement can then be used to stretch at another point and a tack driven as before.

So far as the operation of the device is concerned it is immaterial how it is constructed; but as a simple and perhaps the cheapest manner of constructing it I proceed as follows: The stock is cast or otherwise formed in two parts, L and L', one being shown in Fig. 2, and each embodying one-half the plunger-channel, one-half the tack-receiving channel, and one of the stretching-prongs, the space M for the accommodation of the pivoted tack-holding jaws being recessed in each section, as shown.

In the edges near the recessed portion in each section are provided two small depressions or bearings, $m$, for the reception of projections or trunnions $n$, formed or cast upon the jaws E, as shown in Fig. 3, so that when the two sections are placed together the trunnions on the jaws will enter the recesses and be permitted to turn in their bearings, while the springs for operating them are secured to one of the sections by screws $p$ and press the projections into the bearings, holding them in position and permitting them to turn against the tension of the springs when necessary.

The upper portion, $r$, of each of the jaws is preferably formed flat and arranged to abut on the inner side against the stock in the upper side of the recess M, so as to form a stop preventing the inward motion of the lower end of the jaw when its co-operating jaw is removed, thereby enabling me to place one jaw and spring in position and then the other one without the necessity of holding the jaw first secured outward against its spring while the other one is being applied, as would be the case were there no stop employed and the jaw permitted to move inward as far as the spring would throw it. When the sections are placed together to form the complete implement, they may be connected by any suitable means; but I prefer to pass a rivet or screw, $n'$, through them between the two channels, to pass rivets $o$ $o$ through at the lower end on opposite sides the channels, and to secure the top of the stock by a collar or ring, P, and preferably taper the ends of the sections slightly, so that when driven on it will prevent their separation, (or it may be soldered or otherwise secured,) and between the rivet and collar there may be placed other securing-collars—such as P'—if the length of the stock is such as to require it. If desired, there may be formed upon or secured to this collar P a tack-drawing claw, R, passing beside the handle C' when the latter is down and capable of being used in the ordinary manner for withdrawing tacks when the plunger is removed for the purpose. Instead of making the channels B and F circular and casting one-half in each section, they could be rectangular and three sides be formed in one section, while the other section could have a flat side for closing the channels, one of the stretching-prongs being formed thereon, as before, if desired; but I prefer to form them as described, as a more symmetrical structure is produced.

The manner of forming the jaws with the trunnions upon them and holding them in the open slots in the stock by means of the spring necessitates the employment of but two screws for holding the springs and jaws, thus simplifying and cheapening the construction materially.

It will be understood that the tack holding and driving devices could be employed in implements not having the stretcher-prongs, and I therefore do not desire to be confined to their employment in connection with them.

The implement described is extremely simple, can be readily operated, and the manner of constructing it cheapens the cost materially, as all the parts can be made of cast metal and assembled by an unskilled operator, requiring no fitting or further manipulation.

Various modifications can be made by one skilled in the art—as, for instance, lengthening the stock, so that the operator can stand up to the work—without departing from the spirit of my invention, and I therefore do not desire to be limited to precisely the construction shown.

I claim as my invention—

1. In a carpet-stretcher and tack-driver, the combination, with the stock divided longitudinally, formed in two sections, each section containing a portion of the plunger and tack-receiving channels, one of the stretcher-prongs and the recessed portions beside the prongs, and the sockets or bearings for the jaws, of fastening devices for holding the sections together, the tack-holding jaws having the projections or trunnions arranged to co-operate with the recesses in the sections, substantially as described.

2. In a combined carpet-stretcher and tack-driver, the combination, with the stock divided longitudinally, formed in two sections, each containing a portion of the plunger and tack-receiving channels, one of the stretcher-prongs, recessed portions beside the prongs, and the recesses for the bearings for the tack-holding jaws, of fastening devices for holding the sections together, the tack-holding jaws having the trunnions or projections arranged to co-operate with the recesses in the sections when placed in them, and springs for pressing the jaws toward each other, substantially as described.

3. In a carpet-stretcher and tack-driver, the combination, with the stock, of a collar or ring on the upper end thereof, having a tack-drawing claw formed upon or attached to it, substantially as described.

4. In a carpet-stretcher and tack-driver, the combination, with the stock constructed in two parts, of a collar or ring for binding them together, having a tack-drawing claw formed upon or attached to it, substantially as described.

5. The combination, with the stock having the plunger-channel, an opening communicating therewith for the insertion of tacks, and the open-sided recesses formed at the sides of the end of the plunger-channel, of the tack-holding jaws having bearing portions formed thereon arranged to enter the recesses in the stock, and the springs bearing upon the jaws for holding the bearing portions in the recesses and pressing them together, substantially as described.

6. The combination, with the stock having the plunger-channel, an opening communicating therewith for the insertion of tacks, and the open-sided recesses formed on the sides of the plunger-channel, of the tack-holding jaws having bearings fitting said recesses, and a face engaging the stock and preventing movement too far inward, and the springs bearing on said jaws, holding their bearing portions in the recesses, and pressing them toward each other, substantially as described.

7. The combination, with the stock having the plunger-channel, an opening communicating therewith for the insertion of tacks, and the open-sided recesses formed on the sides of the plunger-channel, of the tack-holding jaws having bearings fitting said recesses, and the flat springs secured to the stock and bearing upon the jaws, holding their bearing portions on the recesses, and pressing them toward each other, substantially as described.

HENRY L. SCOFIELD.

Witnesses:
 FRED F. CHURCH,
 Z. L. DAVIS.